(12) United States Patent
Zhu

(10) Patent No.: US 11,493,921 B2
(45) Date of Patent: Nov. 8, 2022

(54) DYNAMIC PARAMETER ARCHITECTURE FOR QP SMOOTHER

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 633 days.

(21) Appl. No.: 16/562,092

(22) Filed: Sep. 5, 2019

(65) Prior Publication Data

US 2021/0074037 A1 Mar. 11, 2021

(51) Int. Cl.
  *G01C 22/00* (2006.01)
  *G05D 1/00* (2006.01)
(52) U.S. Cl.
  CPC ........ *G05D 1/0088* (2013.01); *G06T 2210/12* (2013.01)
(58) Field of Classification Search
  CPC . G05D 1/0088; G05D 1/0246; G06T 2210/12
  USPC .................................................. 701/25, 102
  See application file for complete search history.

(56) References Cited

U.S. PATENT DOCUMENTS

| 5,648,901 A * | 7/1997 | Gudat | G05D 1/0297 |
| | | | 701/532 |
| 10,379,538 B1 * | 8/2019 | Sheckells | B60W 10/20 |
| 2018/0099667 A1 * | 4/2018 | Abe | G06V 20/588 |
| 2018/0164822 A1 * | 6/2018 | Chu | G01C 21/3492 |
| 2019/0080266 A1 * | 3/2019 | Zhu | G05D 1/0217 |

FOREIGN PATENT DOCUMENTS

| CN | 103542852 A * | 1/2014 | G01C 21/20 |

* cited by examiner

*Primary Examiner* — Hung Q Nguyen
*Assistant Examiner* — Anthony Donald Taylor, Jr.
(74) *Attorney, Agent, or Firm* — Womble Bond Dickinson (US) LLP

(57) ABSTRACT

According to an exemplary method, a smoothing module can be used in an ADV to iteratively perform a smoothing operation on a raw reference segment using an ordered list of sets of smoothing parameters, starting from the set of strictest parameters, until the smoothing operation is successful. The method includes the operations of generating multiple sets of smoothing parameters, including a first set of smoothing parameters, a second set of smoothing parameters, and at least one set of smoothing parameters interpolated in between; for each set of smoothing parameters, performing a quadratic programming (QP) smoothing operation on the raw reference line segment until the QP smoothing operation is successful; and controlling the ADV according to a smoothed reference line segment generated by the successful QP smoothing operation.

20 Claims, 9 Drawing Sheets

DYNAMIC PARAMETER ARCHITECTURE FOR QP SMOOTHER

TECHNICAL FIELD

Embodiments of the present disclosure relate generally to autonomous vehicles. More particularly, embodiments of the disclosure relate to reference line smoothing for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories.

Reference lines can be generated from map data points, typically a sequence of two-dimensional (2D) points in the world coordinate. Reference lines directly generated from the map data points are raw reference lines, which may lack the required smoothness and therefore can lead to unstable and oscillating trajectories between planning cycles. As such, raw reference lines typically need to be smoothed using various smoothing techniques for better driving experiences.

Quadratic programming (QP) is often used for reference line smoothing. However, there is a contention between the closeness of the smoothed reference lines to the original reference line and the success of the smoothing. Generally, the further away the smoothed reference line, the more likely the smoothing will be successful.

Existing solutions include manual adjustment of smoothing parameters to balance the freedoms given to points on a raw reference line and the rate of success. This manual adjustment of smoothing parameters is not optimal and inefficient.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
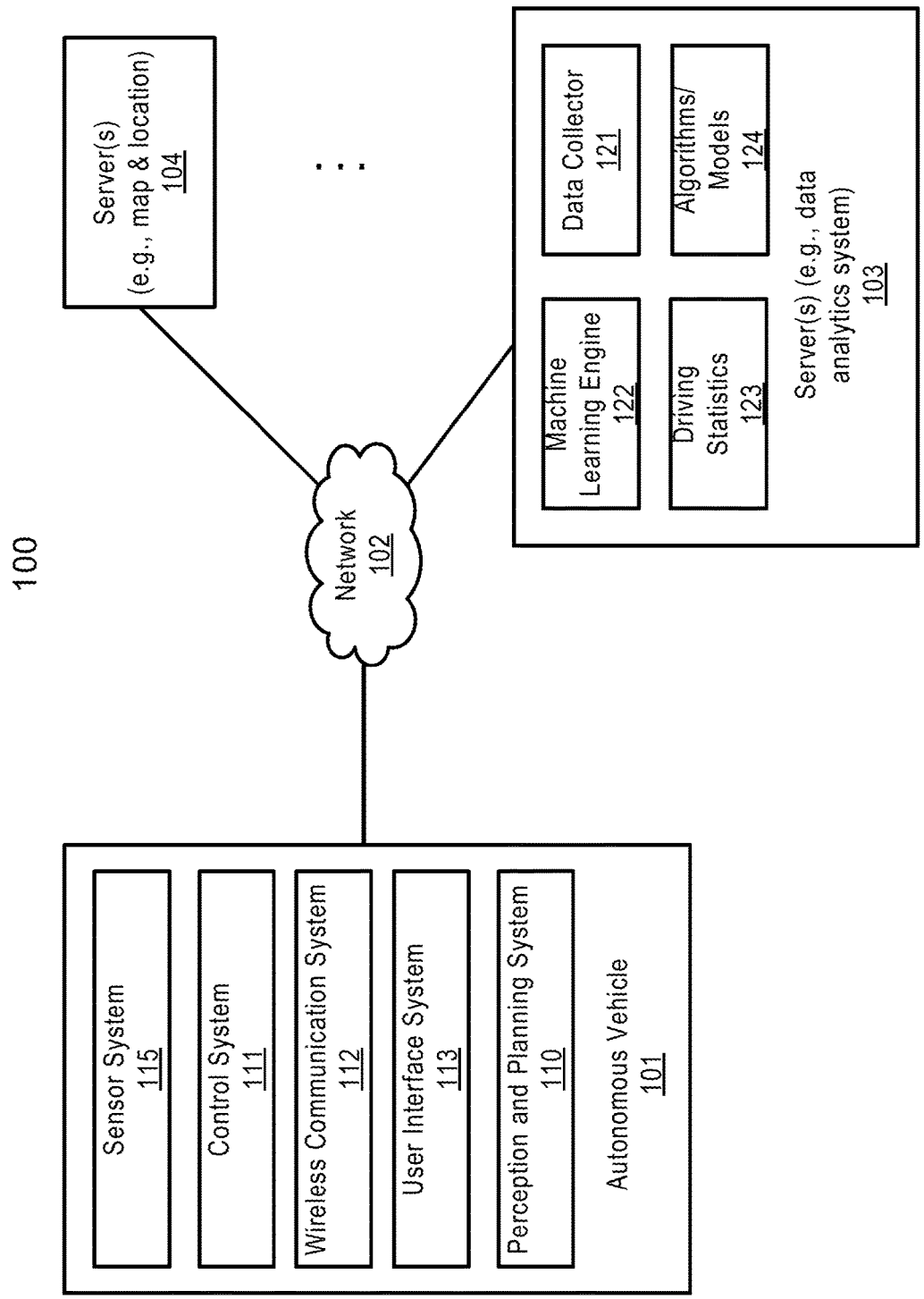
FIG. 1 is a block diagram illustrating an autonomous vehicle network configuration according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

As described above, there is a challenge to find an appropriate balance between appropriate smoothing parameters and the success of smoothing. If the smoothing parameters are too loose, the smoothing would be more likely to be successful, yet the generated smoother reference line may be too far away from the original reference line and may not be that useful in controlling an autonomous driving vehicle.

Embodiments described in the disclosure can enable the finding of a set of appropriate smoothing parameters to avoid the generation of a smoothed reference line that is unnecessarily far from the original reference line. According to an exemplary method, a smoothing module can be used to iteratively perform a smoothing operation using an ordered list of sets of smoothing parameters, starting from the set of strictest parameters, until the smoothing operation is successful. The method includes the operations of generating multiple sets of smoothing parameters, including a first set of smoothing parameters, a second set of smoothing parameters, and at least one set of smoothing parameters interpolated in between; for each set of smoothing parameters, performing a quadratic programming (QP) smoothing operation on a segment of a raw reference line for operating the ADV until the QP smoothing operation is successful; and controlling the ADV according to a smoothed reference line segment generated by the successful QP smoothing operation.

In one embodiment, each set of smoothing parameters includes a longitudinal freedom, a lateral freedom, a degree of polynomial functions, and a number of control points on the segment of the raw reference line. The longitudinal freedom and the lateral freedom in the first set of smoothing parameters are respectively smaller than the longitudinal freedom and the lateral freedom in the second set of smoothing parameters. The multiple sets of smoothing parameters have the same degree of polynomial functions and the same number of control points on the segment of the raw reference line, but different longitudinal freedoms and different lateral freedoms.

In one embodiment, when performing the QP smoothing operation for each of the plurality of sets of smoothing parameters, the smoothing module can perform the following operations: determining a boundary box centered around each of the number of control points on the segment of the raw reference line, and the boundary box has the longitudinal freedom of the set of smoothing parameters as the length and the lateral freedom of the set of smoothing parameters as the width; selecting a number of two-dimensional polynomials, each representing a segment of an optimal reference line between adjacent control points; and defining a set of constraints to the two-dimensional polynomials to enable the two-dimensional polynomials to pass through each of the plurality of boundary boxes.

In one embodiment, the multiple sets of smoothing parameters are ordered ascendingly, starting with the first set of smoothing parameters. Further, the ratio between the longitudinal freedom and the lateral freedom in each set of smoothing parameters is the same.

In one embodiment, the smoothing module can perform the smoothing operations on a raw reference in advance for better performance. This can happen when the ADV invokes the smoothing module to generate a smoothed reference line based a HD map for a whole trip beforehand for better performance.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
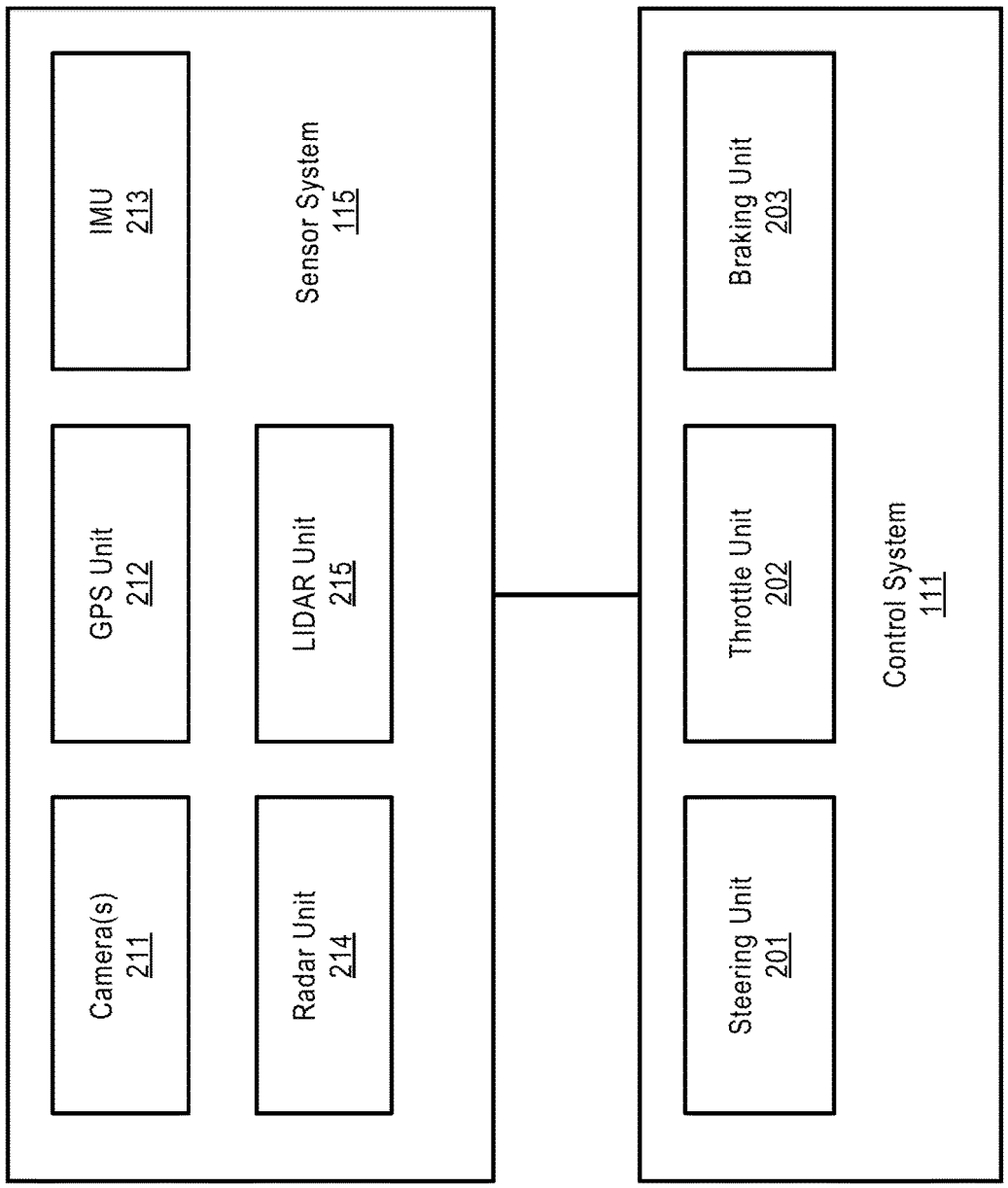
FIG. 2 is a block diagram illustrating an example of an autonomous vehicle according to one embodiment.

FIG. 2 is a block diagram illustrating an example of an autonomous vehicle according to one embodiment. In FIG. 2, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, for example, algorithms 124 may include an optimization method to optimize path planning and speed planning. The optimization method may include a set of cost functions and polynomial functions to represent path segments or time segments. These functions can be uploaded onto the autonomous driving vehicle to be used to generate a smooth path at real time.

Figure 3A:
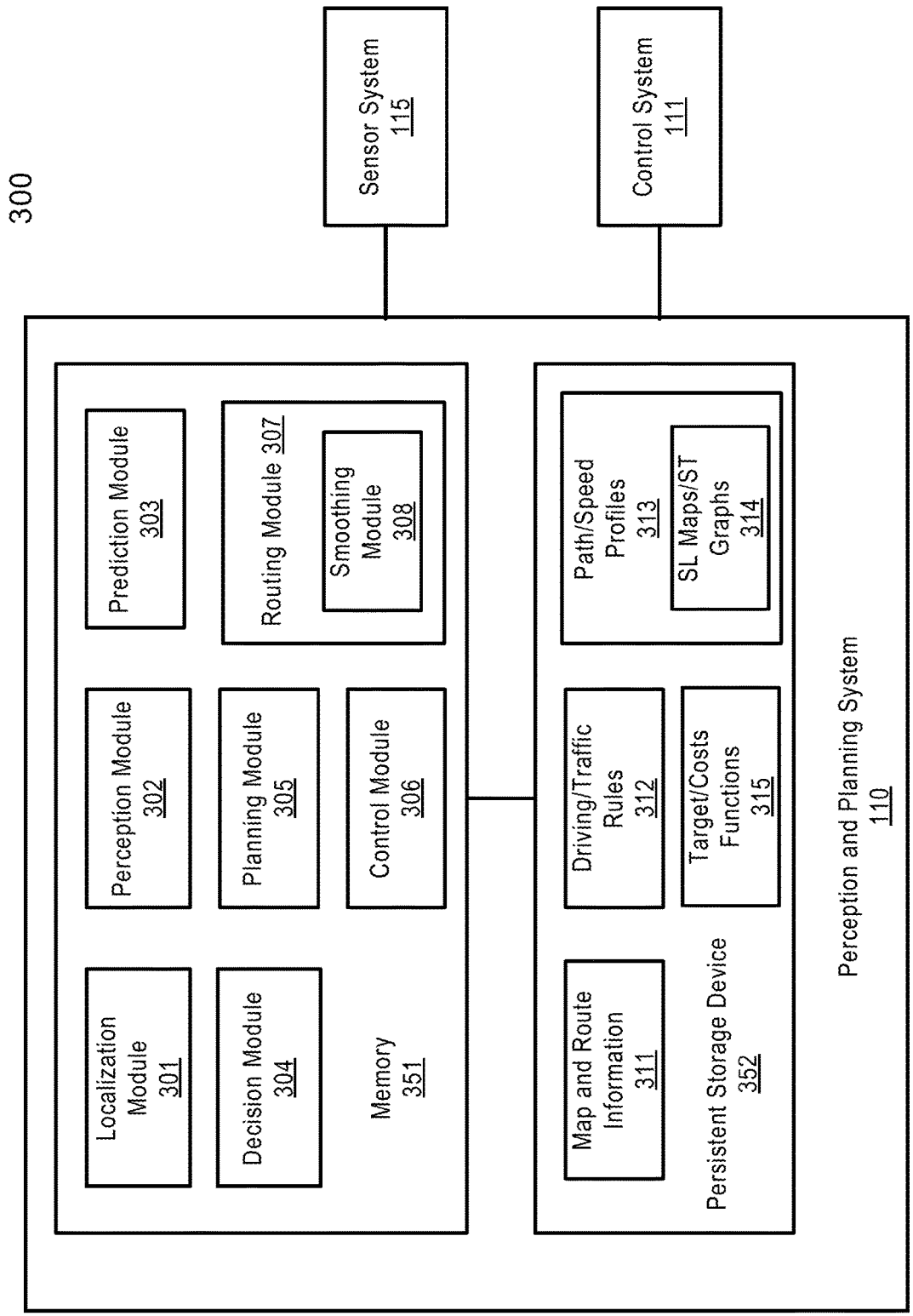
FIGS. 3A-3B are block diagrams illustrating examples of a perception and planning system used by an autonomous vehicle according to some embodiments.
Figure 3B:
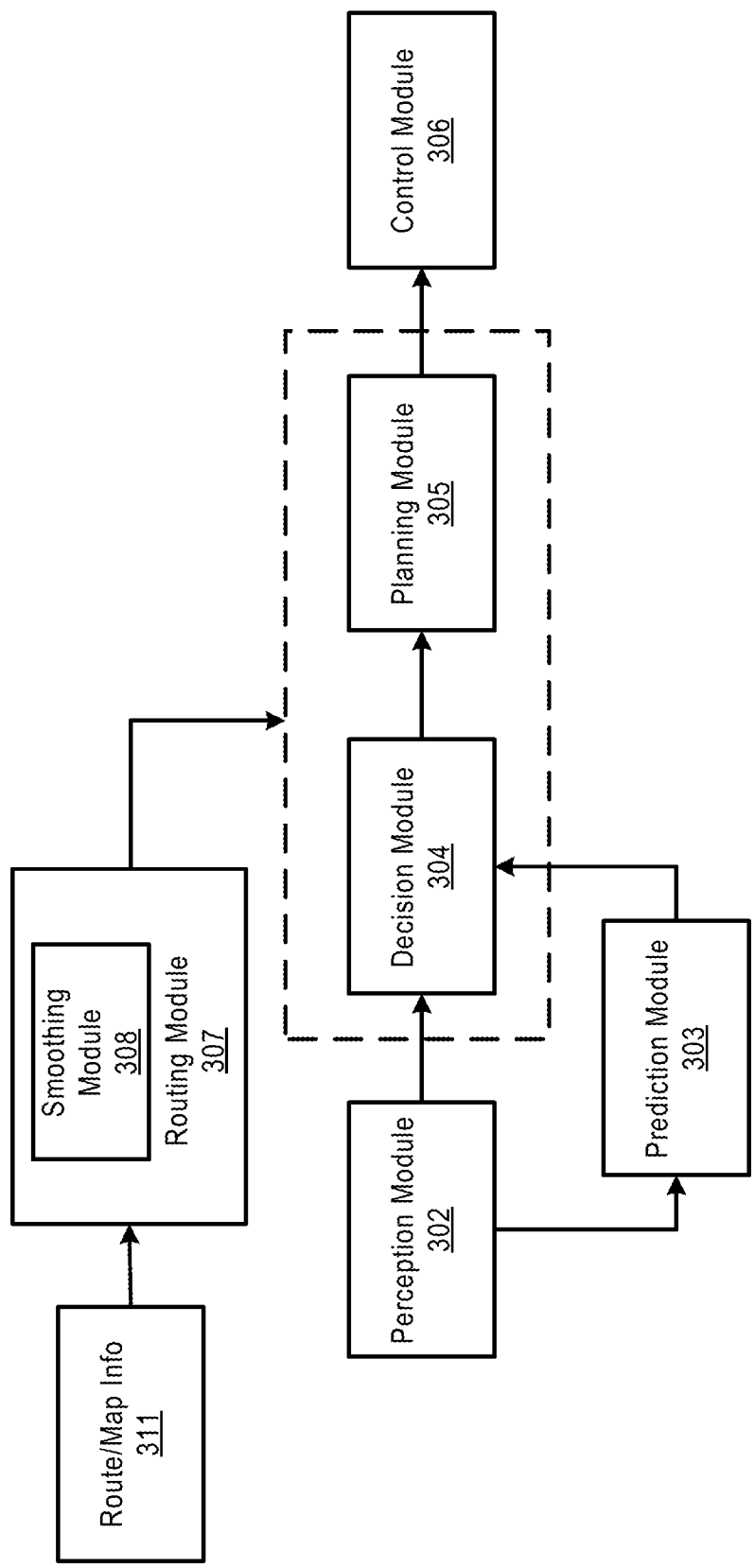

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and smoothing module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module; and routing module 307 and smoothing module 308 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Smoothing module 308 can generate a smooth road reference line based on a reference line provided by routing module 307. For example, smoothing module 308 selects a number of control points along a reference line. In one embodiment, the control points can be reference points of the reference line provided by routing module 307 or some interpolated points along the reference line which are approximately equally distant to their adjacent points. Smoothing module 308 adds a set of constraints representing boundary areas (e.g., boundary boxes with preconfigured dimensions and/or directions) around each of the control points. Smoothing module 308 adds a set of joint smoothness constraints to guarantee a number of piecewise polynomials, representing segments of reference lines between adjacent control points, are joined together smoothly. Smoothing module 308 selects a target function with a set of kernels or weighting functions, which the piecewise polynomials will target on. Smoothing module 308 uses a quadratic programming solver to optimize the target function to generate the smooth road reference line.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

For example, a road segments table can be a name-value pair to include previous and next road lanes for road segments A-D. E.g., a road segments table may be: {(A1, B1), (B1, C1), (C1, D1)} for road segments A-D having lane 1. A reference points table may include reference points in x-y coordinates for road segments lanes, e.g., {(A1, (x1, y1)), (B1, (x2, y2)), (C1, (x3, y3)), (D1, (x4, y4))}, where A1 . . . D1 refers to lane 1 of road segments A-D, and (x1, y1) . . . (x4, y4) are corresponding real world coordinates. In one embodiment, road segments and/or lanes are divided into a predetermined length such as approximately 200 meters segments/lanes. In another embodiment, road segments and/or lanes are divided into variable length segments/lanes depending on road conditions such as road curvatures. In some embodiments, each road segment and/or lane can include several reference points. In some embodiments, reference points can be converted to other coordinate systems, e.g., latitude-longitude.

In some embodiments, reference points can be converted into a relative coordinates system, such as station-lateral (SL) coordinates. A station-lateral coordinate system is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and an one meter lateral offset from the reference line, e.g., offset to the left by one meter.

In one embodiment, smoothing module 308 generates a smooth reference line based on reference points representing a reference line provided by routing module 307. The smooth reference line can be converted into a relative coordinate system such as a SL coordinate system before a decision module and/or a planning module such as decision module 304 and/and planning module 305 incorporates the smooth reference line with perceived obstacles and/or traffic information.

In one embodiment, decision module 304 generates a rough path profile based on a reference line (the reference line having been smoothed by smoothing module 308 as described above) provided by routing module 307 and based on obstacles and/or traffic information perceived by the ADV, surrounding the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs 314 which may be stored in persistent storage devices 352.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP). In one embodiment, the recalculated rough path profile includes a station-lateral map (as part of SL maps/ST graphs 314).

In one embodiment, planning module 305 recalculates the rough speed profile using quadratic programming (QP) to optimize a speed cost function (as part of cost functions 315). Similar speed barrier constraints can be added to forbid the QP solver to search for some forbidden speeds. In one embodiment, the recalculated rough speed profile includes a station-time graph (as part of SL maps/ST graphs 314).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Quadratic Programming (QP) Smoothing

Figure 4:
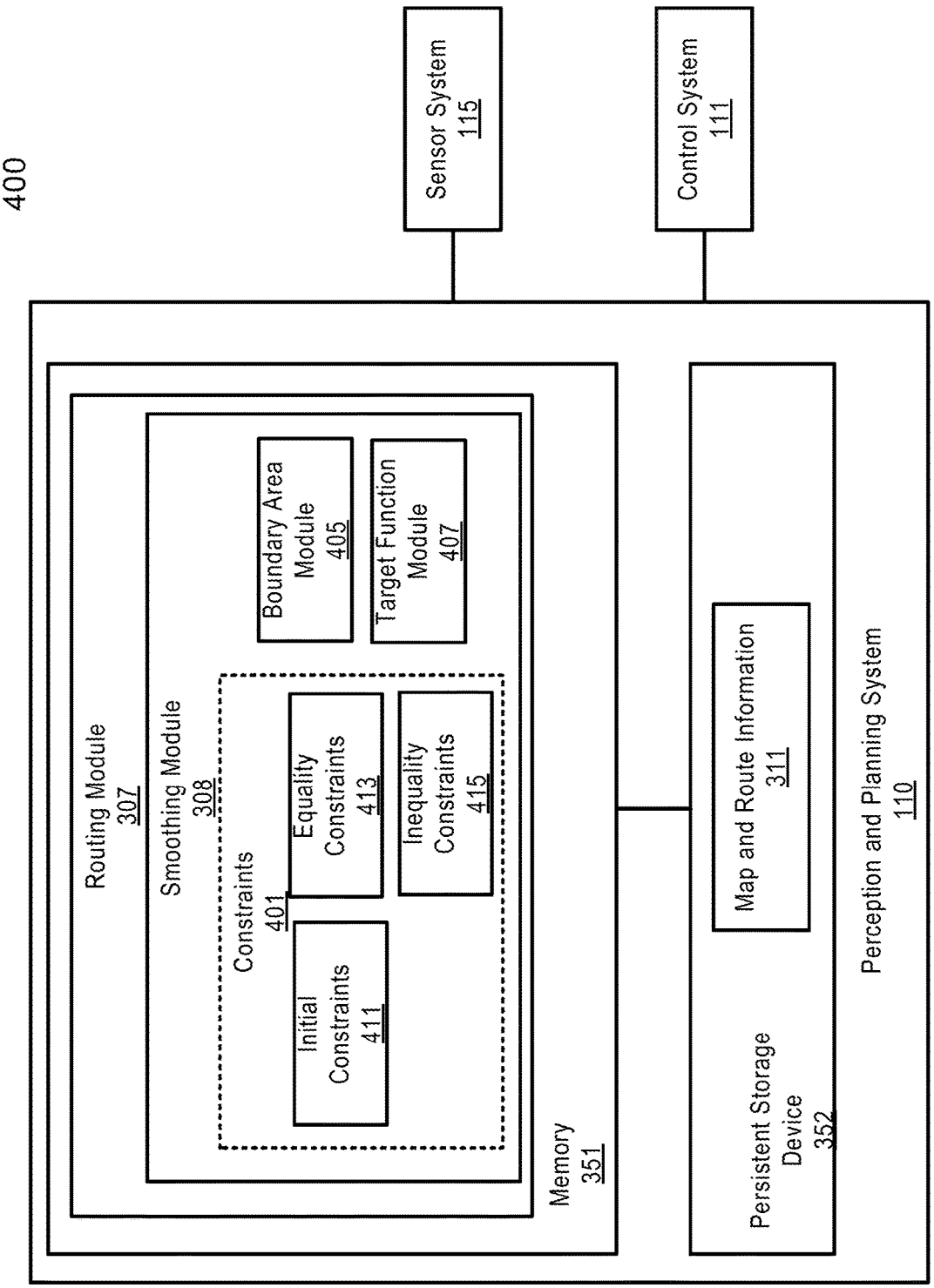
FIG. 4 is a block diagram illustrating an example of a smoothing module according to one embodiment.

FIG. 4 is a block diagram illustrating an example of a smoothing module according to one embodiment. Referring to FIG. 4, smoothing module 308 can apply a smoothing optimization based on a two dimensional (2D) spline (e.g., two dimensional piecewise polynomials). Smoothing module 308 can include constraints module 401, boundary box module 405, and target function module 407. Constraints module 401 can define definitions for essential constraints, limitations, restrictions, or conditions the QP optimization problem must satisfy. Constraints module 401 can include, but not limited to, initial constraints 411, equality constraints 413, and inequality constraints 415. Initial constraints 411 include a set of constraints corresponding to the ADV's initial conditions, e.g., ADV's immediate direction and/or geographical location. Equality constraints 413 include a set of equality constraints that assert some equality condition must be satisfied. For example, equality constraints 413 can include a set of constraints that guarantee joint smoothness and/or some pointwise constraints are satisfied (e.g., the spline will pass some points or have some specific point heading). Inequality constraints 415 include a set of inequality constraints that guarantee the spline is within some boundary (e.g., less than or greater than some constraint value). For example, inequality constraints 415 can include a set of constraints that guarantee the spline will pass through some boundaries. Both inequality and equality constraints are hard constraints, meaning that it is required that they are satisfied. Boundary Box module 405 can build boundary areas (e.g., boundary boxes) surrounding each control points. Target function module 407 can generate one or more kernels as target function parameters for quadratic programming optimization.

Figure 5:
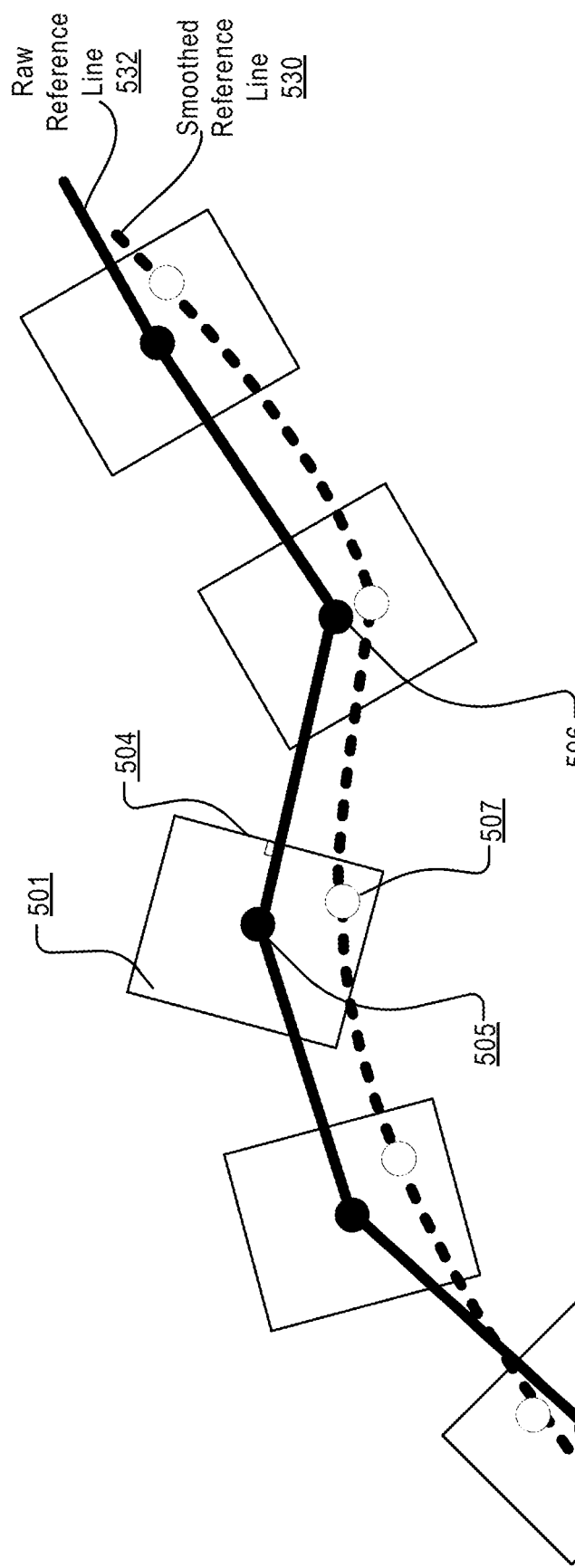
FIG. 5 illustrates an example system of smoothing a raw reference line according to one embodiment.

FIG. 5 is a block diagram illustrating an example system of smoothing a raw reference line according to one embodiment. The routing module 307 provides the ADV with map or route segments information based on a GPS location of the ADV. A raw reference line 532 can be generated based on the map and route segments information. In one embodiment, the raw reference line 532 can be represented by a number of control points, for example, control point A 505. The control points can be approximately equally spaced apart, for example, approximately five to ten meters apart.

Based on the control points, a smoothing module, such as smoothing module 308 of FIG. 3A, applies a 2D QP spline optimization to generate a smoothed reference line 530 for use in controlling the ADV. The smoothed reference line 530 is a spline represented by one or more (e.g., piecewise) polynomials joined together. For example, a polynomial or a polynomial function can represent a segment between two adjacent control points of the number of control points.

In one embodiment, each polynomial function within the spline can be a two dimensional polynomial(s), e.g., $$x(t)=p_0+p_1t+p_2t^2+\ldots+p_nt^n, \text{ and } y(t)=q_0+q_1t+q_2t^2+\ldots+q_nt^n,$$

where x, y represents a two dimensional (x, y) geometric coordinate for a polynomial to the nth order, and $p_{0\ldots n}$ and $q_{0\ldots n}$ are coefficients of the two dimensional polynomial to be solved.

In another embodiment, the polynomial function can be one dimensional. E.g., $$l(s)=p_0+p_1s+p_2s^2+\ldots+p_ns^n,$$

where s, l represents a station-lateral one dimensional (s, l) geometric coordinate for a polynomial to the nth order, and $p_{0\ldots n}$ are coefficients of the one dimensional polynomials to be solved.

Referring to FIG. 4, the smoothing module 308 configures an order (i.e. degree) of polynomial for the spline or piecewise polynomials to ensure a desired threshold of spline smoothness. In one embodiment, the piecewise polynomials can be preconfigured to a fifth order polynomials. Based on the control points, boundary box module 405 can define a boundary area, such as boundary box 501, with a predefined dimension, such as, approximately 0.2 meters by 0.4 meters, to surround each of the control points. The boundary areas can represent an inequality constraint (as part of inequality constraints 415) that the smoothed reference line (e.g., spline or piecewise polynomials) 530 must touch or pass through.

For example, a control point (x1, y1) 505 with a boundary box of 0.2 meters by 0.4 can include inequality constraints for the spline at point C (x(1), y(1)) 507, such as:

$$x_1-0.1 \le x(1) \le x_1+0.1, \text{ and } y_1-0.1 \le y(1) \le y_1+0.2,$$

where (x1, y1) are x-y coordinates of a control point, and (x(1), y(1)) are x-y coordinates of the spline near the control point.

Equality constraint 413 or inequality constraint 415 can include an edge 504 as a directional constraint imposed on the boundary box 501, such that the spline will have a specific point heading. In some embodiments, constraint module 401 can add a set of joint constraints (as part of equality constraint 413) to ensure joint smoothness, for example, $$x_2(t)=x_1(t) \text{ and } y_2(t)=y_1(t),$$

$$x'_2(t)=x'_1(t) \text{ and } y'_2(t)=y'_1(t),$$

$$x''_2(t)=x''_1(t) \text{ and } y''_2(t)=y''_1(t),$$

where $x_1(t)$ and $x_2(t)$ are two adjacent x polynomials at value t; $y_1(t)$ and $y_2(t)$ are two adjacent y polynomials at value t; and $x'_1(t)$, $y'_1(t)$, and $x''_1(t)$, and $y''_1(t)$, are the first and the second derivatives of the two dimensional piecewise polynomials at value t. Here, the second order derivative equality constraints ensure a certain threshold of joint smoothness between adjacent points.

Constraint module 403 can add a set of initial constraints (as part of initial constraints 411) to the piecewise polynomials. The set of initial constraints can correspond to a current geographical location and/or a current directional heading of the ADV, for example, $x(0)=x_0$ and $y(0)=y_0$, $x'(0)=dx_0$ and $y'(0)=dy_0$, where $(x_0,y_0)$ is the current x-y coordinate of the ADV geographical location, $(dx_0,dy_0)$ is a current direction of the ADV, and $x(0)$, $y(0)$ corresponds to the initial values of the first x-y polynomial. In some embodiments, constraint module 401 can add a set of end constraints corresponding to a location and a direction of the ADV when the ADV reaches a destination point.

In some embodiments, smoothing module 308 can select a target function (as part of target functions 407) with various kernels or costs functions which the spline will target on. Example target functions can include smoothing kernels and/or guidance kernels such as:

$$w_1\int (x')^2(t)dt+w_2\int (y')^2(t)dt+w_3\int (x'')^2(t)dt+w_4\int (y'')^2(t)dt+\\w_5\int (x''')^2(t)dt+w_6\int (y''')^2(t)dt+w_7\int [x(t)-x_{ref}(t)]^2dt+\\w_8\int [y(t)-y_{ref}(t)]^2dt$$

where $x(t)$, $y(t)$ are x-y two dimensional piecewise polynomials, $w_1, \ldots, w_8$ are weight factors, $(x')^2(t)$, $(y')^2(t)$ are the first derivative squares of the piecewise polynomials, $(x'')^2(t)$, $(y'')^2(t)$ are the second derivative squares of the piecewise polynomials, $(x''')^2(t)$, $(y''')^2(t)$ are the third derivative squares of the piecewise polynomials, and $x_{ref}(t)$, $y_{ref}(t)$ are x-y reference route values of average human driving routes from previously collected data.

In one embodiment, the edge 504 can be perpendicular to the segment AB on the raw reference line 532. The dimensions of the boundary box 501 define a longitudinal freedom and a lateral freedom used by the smoothing module 308 to smooth the raw reference line 532.

As used herein, a longitudinal freedom is the maximal longitudinal distance allowed between an original point (e.g., point 505) on the raw reference line 532 to a corresponding point (e.g., point 507) on the smoothed reference line 530, and a lateral freedom is the maximal lateral distance allowed between the original point on the raw reference line 532 and the corresponding point on the smoothed reference line 530. A lateral freedom is parallel to the edge 504 and a longitudinal freedom is perpendicular to the edge 504.

Dynamic QP Smoother

Figure 6:
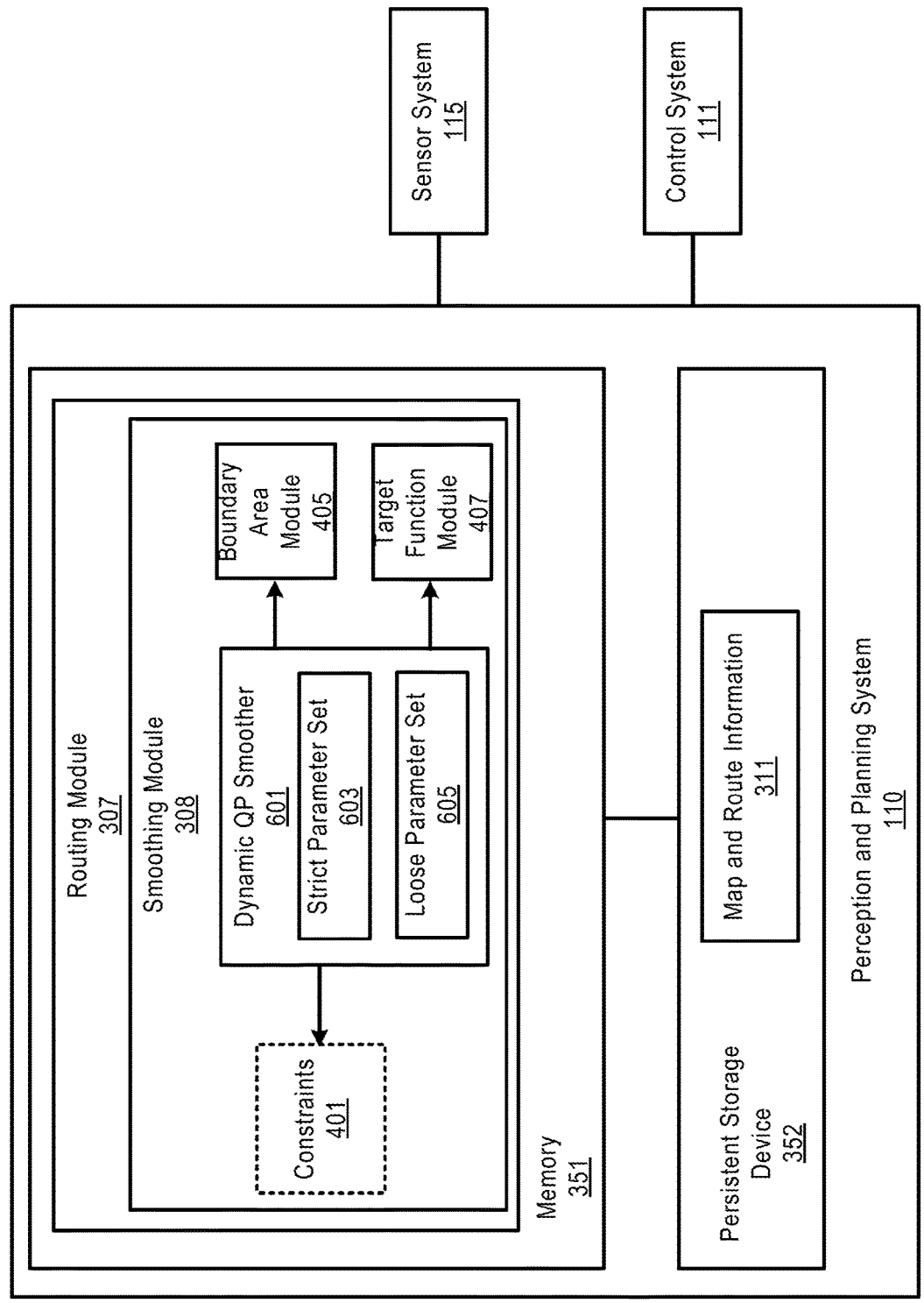
FIG. 6 illustrates a dynamic QP smoother according to one embodiment.

FIG. 6 illustrates a dynamic QP smoother according to one embodiment. As shown in FIG. 6, a dynamic QP smoother 601 can include two sets of smoothing parameters. The first set of smoothing parameters 603 is stricter, and the second set of smoothing parameters 605 is looser.

The two sets of smoothing parameters can be provided by default by the dynamic QP smoother 601, and can be adjusted via a user interface. In one embodiment, the dynamic QP smoother 601 can interpolate a number of sets of smoothing parameters between the first set of smoothing parameters 603 and the second set of smoothing parameters 605.

In one embodiment, each set of smoothing parameters (i.e., the two sets of default smoothing parameters and the interpolated smoothing parameter sets) can have the same smoothing parameters, including a longitudinal freedom, a lateral freedom, a degree of polynomial functions, and a number of control points on the segment of the raw reference line.

In one embodiment, each set of smoothing parameters has a different longitudinal freedom and a different lateral freedom. The ratio between the longitudinal freedom and the lateral freedom in each set of smoothing parameters is the same. As a result, the dimension ratios for the boundary boxes generated for all smoothing parameter sets can be the same.

However, each set of smoothing parameters has the same degree of polynomial functions, and the same number of control points. If there are other QP parameters defined by the dynamic QP smoother, the values of those QP parameters are also the same for each set of smoothing parameters.

In one embodiment, the smoothing parameter sets can be ordered ascendingly, with the strict parameter set 603 being the first set in the ordered list of smoothing parameter sets, followed by a set of smoothing parameters with a next bigger longitudinal freedom.

In one embodiment, when being invoked, the dynamic QP smoother 601 can use the strict parameter set to smooth a raw reference line segment. As shown in FIG. 6 and as described in FIG. 4 and FIG. 5, the dynamic QP smoother 601 can call the constraints module 401, the boundary area module 405, and the target function module 407 in the smoothing process.

If the smoothing operation fails on the strict parameter set, the next set of smoothing parameter in the ordered list of smoothing parameter sets can be used to smooth the reference line. The process can be repeated until the smoothing operation succeeds. If the smoothing operation fails on all smoothing parameter sets, the raw reference line segment can be used as the smoothed reference line segment, where curvature, heading information can be calculated from adjacent raw points.

In one embodiment, a loop structure can be used in the dynamic QP smoother 601 to smooth a segment of a raw reference line using the sets of smoothing parameters. The loop can be the terminated when the smoothing operation succeeds on a set of smoothing parameters of in the ordered list of smoothing parameter sets.

After the first segment of a raw reference line is smoothed, the dynamic QP smoother 601 can start to smooth the next segment of raw reference line by performing the operations as described above. The smoothed reference line segments can be concatenated for use in controlling the ADV.

Figure 7:
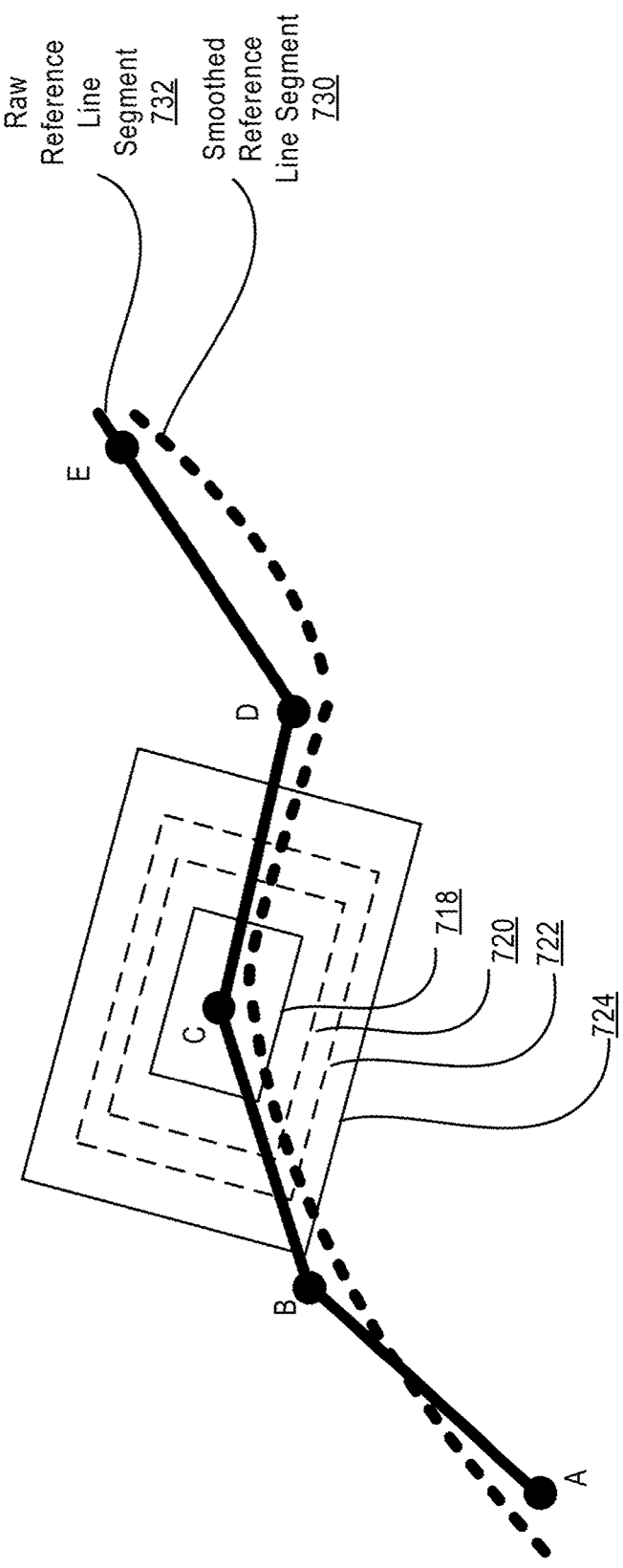
FIG. 7 illustrates an example of using the dynamic QP smoother according to one embodiment.

FIG. 7 illustrates an example of using the dynamic QP smoother according to one embodiment. As shown in FIG. 7, a set of strict smoothing parameters 701 and a set of loose smoothing parameters can be prepared by a dynamic QP smoother, such as the dynamic QP smoother 601 as described in FIG. 6. The two sets of smoothing parameters can be provided by default or can be generated by a configuration file, which can be modified via a user interface.

In FIG. 7, the strict parameter set 701 includes lateral freedom A 705, longitudinal freedom A 709, interval A between control points 711, and degree A of polynomial functions 713. Similarly, the loose parameter set 703 includes lateral freedom B 707, longitudinal freedom B 710, interval B between control points 712, and degree B of polynomial functions 714. The parameters in both sets of parameters are provided for illustration purposes, and one or more additional smoothing parameters for QP optimization/smoothing can be included in both sets of parameters.

As shown in FIG. 7, the lateral freedom A 705 in the strict parameter set 701 is different from the lateral freedom B 707 in the loose parameter set 703. Similarly, the longitudinal freedom A 709 in the strict parameter set 701 is different from the longitudinal freedom B in the loose parameter set 703.

However, the two sets of smoothing parameters have a same value of 5 meters for interval A 711 and interval B 712, and a same value of 5 for degree A 713 and degree B 714. Any additional parameter that may be included in the parameter sets would have the same value for both sets of parameters.

In one embodiment, as the ADV is driving, a predetermined raw reference line (e.g., 120 meters) can be generated. A smoothing module, such as the smoothing module 308 can smooth the reference line segment by segment. Within each segment, a number of control points (e.g., A, B, E, D, and E) are selected for use in smoothing the raw reference line segment. all segments are smoothed, the smoothed reference line segments can be concatenated to form a smoothed reference line for use in controlling the ADV.

In one embodiment, a number of sets of smoothing parameters can be interpolated between the strict parameter set 701 and the loose parameter set 703. Each of the interpolated parameter sets can include the same parameters as the strict parameter set 701 or the loose parameter set 703, but with a different longitudinal freedom and a lateral freedom.

In one embodiment, the number of sets of interpolated parameters can be determined based on historical driving statistics. As an illustrative example, if 2 sets of smoothing parameters are to be interpolated based on collected historical driving statistics, the dynamic QP smoother 601 can divide the absolute value of the difference between the lateral freedom A 705 and the lateral freedom B 707 by 3 (the number of intervals between lateral freedom A 705 and the lateral freedom B 707) to get an incremental value of |0.5−0.05|/3, which is 0.15 m. The incremental value can be used to generate the lateral freedoms of the interpolated parameters sets.

For example, the lateral freedom in the first set of interpolated parameters would be 0.05+0.15=0.20 m. Since the ratio between the longitudinal freedom and the lateral freedom for each set of parameters is fixed, the longitudinal freedom of the first set of interpolated parameters can be calculated based on the lateral freedom (i.e., 0.20 m) and the ratio between lateral freedom A 705 and the longitudinal freedom A 709. In this example, the longitudinal freedom would be (0.20*0.2)/0.05=0.8 m.

The lateral freedom of the second set of interpolating parameters would be 0.05+0.15+0.15=0.35 m, and the longitudinal freedom would be (0.35*0.2)/0.05=1.4 m.

Therefore, in the embodiment shown by the example above, there is an equal interval between lateral freedoms in two adjacent parameter sets, and also an equal interval between longitudinal freedoms in two adjacent parameter sets.

In other embodiments of the invention, the interval between lateral freedoms or longitudinal freedoms between two adjacent parameter sets may not be equal, and the ratios between lateral freedoms and longitudinal freedoms in different parameters set also may also be different, rather than being fixed as shown in the example above.

In one embodiment, the four sets of smoothing parameters can be used by the dynamic QP smoother 601 to smooth a first segment AE 732 of a raw reference line. The first segment AE can be represented by the five control points A, B, C, D and E.

For each of the control points, the dynamic QP smoother 601 can invoke the boundary box module 405 as described in FIG. 4 to generate a boundary box for each set of smoothing parameters.

FIG. 7 uses control point C as an example. As shown, 4 boundary boxes 718, 720, 722, and 724 are generated centered around control point C. Each boundary box is formed by a lateral freedom and a longitudinal freedom in one of the 4 sets of smoothing parameters. For example, boundary box 718 is formed by the lateral freedom A 705 and the longitudinal freedom A 709 in the strict parameter set 701. Therefore, the boundary box 718 has a width of 0.05 m and a length of 0.2 m. Each of the 4 other control points in the raw reference line segment AE can have the same set of boundary boxes as control point C.

The dynamic QP smoother 601 can perform a smoothing operation using the strict parameter set 701 first. If a smoothed reference line segment, for example, smoothed reference line segment 730, is generated and passes the smallest boundary box (i.e. boundary box 718) around each of the five control points, the smoothing operation is considered successful. Otherwise, the dynamic QP smoother 601 can perform a smoothing operation using a looser parameter set, which is the parameter set with a lateral freedom of 0.2 m and a longitudinal freedom of 0.8 m. If the smoothing operation fails again, the dynamic QP smoother 601 can try the next parameter set. If all four sets of parameters are used and the smoothing operations all fails, the raw reference line segment AE 732 would be used as the smothered reference line segment, and the dynamic QP smoother 601 can move to a next raw reference line segment to smooth.

Figure 8:
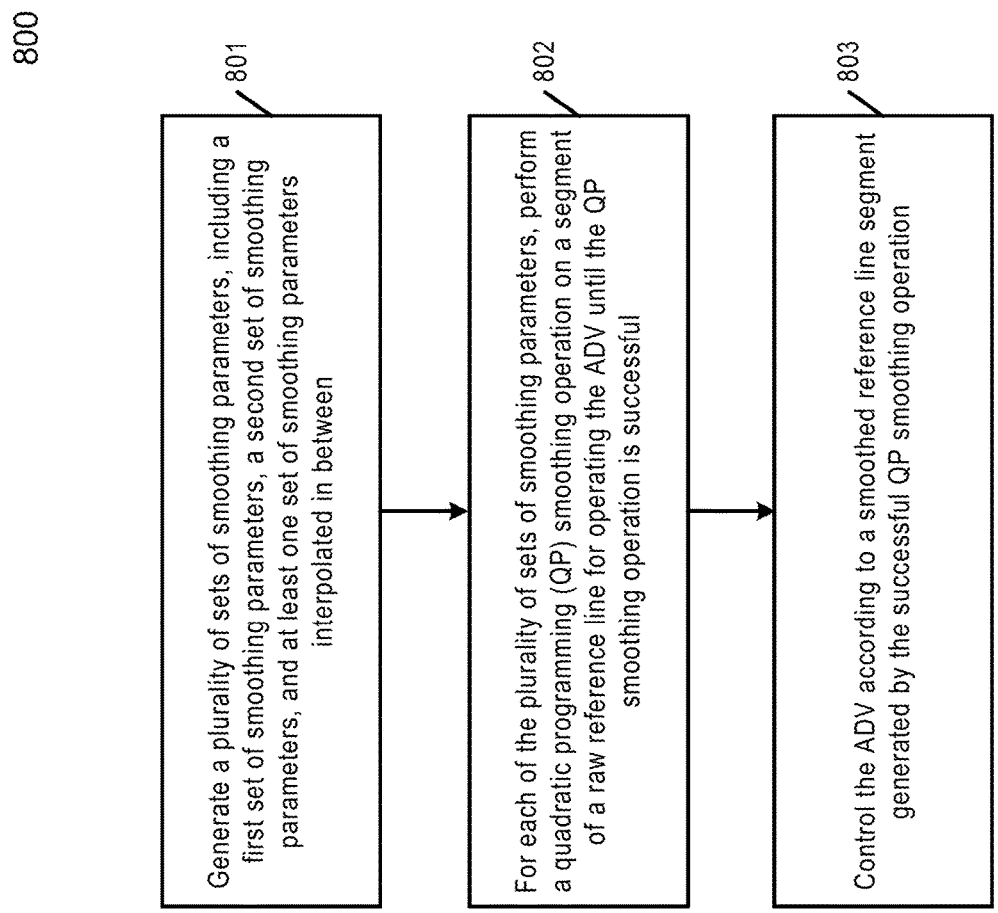
FIG. 8 illustrates an example process of smoothing a raw reference line according to one embodiment.

FIG. 8 illustrates an example process 800 of smoothing a raw reference line according to one embodiment. Process 800 may be performed by processing logic which may include software, hardware, or a combination thereof. For example, process 800 may be performed by the dynamic QP smoother 601 described in FIG. 6 and FIG. 6.

Referring back to FIG. 8, in operation 801, the processing logic generates a plurality of sets of smoothing parameters, including a first set of smoothing parameters, a second set of smoothing parameters, and at least one set of smoothing parameters interpolated in between. In operation 802, for each of the plurality of sets of smoothing parameters, the processing logic performs a quadratic programming (QP) smoothing operation on a segment of a raw reference line for operating the ADV until the QP smoothing operation is successful. In operation 803, the processing logic controls the ADV according to a smoothed reference line segment generated by the successful QP smoothing operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
   generating a plurality of sets of smoothing parameters, including a first set of smoothing parameters, a second set of smoothing parameters that are looser than the first set, and at least one set of smoothing parameters interpolated between the first set and the second set of smoothing parameters;
   for each of the plurality of sets of smoothing parameters, performing a quadratic programming (QP) smoothing operation on a segment of a raw reference line until the QP smoothing operation satisfies a predetermined condition; and
   planning a trajectory to control the ADV according to a smoothed reference line segment generated by the QP smoothing operation.

2. The method of claim 1, wherein each of the plurality of sets of smoothing parameters includes a longitudinal freedom, a lateral freedom, a degree of polynomial functions, and a number of control points selected on the segment of the raw reference line.

3. The method of claim 2, wherein the longitudinal freedom and the lateral freedom in the first set of smoothing parameters are respectively smaller than the longitudinal freedom and the lateral freedom in the second set of smoothing parameters.

4. The method of claim 3, wherein the plurality of sets of smoothing parameters have a same degree of polynomial functions and a same number of control points selected on the segment of the raw reference line, but different longitudinal freedoms and different lateral freedoms.

5. The method of claim 3, wherein the plurality of sets of smoothing parameters are ordered ascendingly, starting with the first set of smoothing parameters.

6. The method of claim 3, wherein a ratio between the longitudinal freedom and the lateral freedom in each set of smoothing parameters is the same.

7. The method of claim 1, wherein performing the QP smoothing operation for each of the plurality of sets of smoothing parameters further comprises:
   determining a boundary box centered around each of a number of control points on the first segment of the raw reference line, wherein the boundary box has a longitudinal freedom of the set of smoothing parameters as a length and a lateral freedom of the set of smoothing parameters as a width;
   selecting a plurality of two-dimensional polynomials each representing a segment of an optimal reference line between adjacent control points; and
   defining a set of constraints to the two-dimensional polynomials to enable the plurality of two-dimensional polynomials to pass through the boundary box.

8. A non-transitory machine-readable medium having instructions stored therein for storing point cloud data in an autonomous driving vehicle (ADV), the instructions, when executed by a processor, cause the processor to perform operations, the operations comprising:
   generating a plurality of sets of smoothing parameters, including a first set of smoothing parameters, a second set of smoothing parameters that are looser than the first set, and at least one set of smoothing parameters interpolated between the first set and the second set of smoothing parameters;
   for each of the plurality of sets of smoothing parameters, performing a quadratic programming (QP) smoothing operation on a segment of a raw reference line until the QP smoothing operation satisfies a predetermined condition; and
   planning a trajectory to control the ADV according to a smoothed reference line segment generated by the QP smoothing operation.

9. The non-transitory machine-readable medium of claim 8, wherein each of the plurality of sets of smoothing parameters includes a longitudinal freedom, a lateral freedom, a degree of polynomial functions, and a number of control points selected on the segment of the raw reference line.

10. The non-transitory machine-readable medium of claim 9, wherein the longitudinal freedom and the lateral freedom in the first set of smoothing parameters are respectively smaller than the longitudinal freedom and the lateral freedom in the second set of smoothing parameters.

11. The non-transitory machine-readable medium of claim 10, wherein the plurality of sets of smoothing parameters have a same degree of polynomial functions and a same number of control points selected on the segment of the raw reference line, but different longitudinal freedoms and different lateral freedoms.

12. The non-transitory machine-readable medium of claim 10, wherein the plurality of sets of smoothing parameters are ordered ascendingly, starting with the first set of smoothing parameters.

13. The non-transitory machine-readable medium of claim 10, wherein a ratio between the longitudinal freedom and the lateral freedom in each set of smoothing parameters is the same.

14. The non-transitory machine-readable medium of claim 8, wherein performing the QP smoothing operation for each of the plurality of sets of smoothing parameters further comprises:
  determining a boundary box centered around each of a number of control points on the first segment of the raw reference line, wherein the boundary box has a longitudinal freedom of the set of smoothing parameters as a length and a lateral freedom of the set of smoothing parameters as a width;
  selecting a plurality of two-dimensional polynomials each representing a segment of an optimal reference line between adjacent control points; and
  defining a set of constraints to the two-dimensional polynomials to enable the plurality of two-dimensional polynomials to pass through the boundary box.

15. A data processing system, comprising:
  a processor; and
  a memory coupled to the processor to store instructions, which when executed by the processor, cause the processor to perform operations, the operations including
    generating a plurality of sets of smoothing parameters, including a first set of smoothing parameters, a second set of smoothing parameters that are looser than the first set, and at least one set of smoothing parameters interpolated between the first set and the second set of smoothing parameters,
    for each of the plurality of sets of smoothing parameters, performing a quadratic programming (QP) smoothing operation on a segment of a raw reference line until the QP smoothing operation satisfies a predetermined condition, and
    planning a trajectory to control an autonomous driving vehicle (ADV) according to a smoothed reference line segment generated by the QP smoothing operation.

16. The system of claim 15, wherein each of the plurality of sets of smoothing parameters includes a longitudinal freedom, a lateral freedom, a degree of polynomial functions, and a number of control points selected on the segment of the raw reference line.

17. The system of claim 16, wherein the longitudinal freedom and the lateral freedom in the first set of smoothing parameters are respectively smaller than the longitudinal freedom and the lateral freedom in the second set of smoothing parameters.

18. The system of claim 17, wherein the plurality of sets of smoothing parameters have a same degree of polynomial functions and a same number of control points selected on the segment of the raw reference line, but different longitudinal freedoms and different lateral freedoms.

19. The system of claim 17, wherein the plurality of sets of smoothing parameters are ordered ascendingly, starting with the first set of smoothing parameters.

20. The system of claim 17, wherein a ratio between the longitudinal freedom and the lateral freedom in each set of smoothing parameters is the same.

* * * * *